US012614103B1

(12) United States Patent
Lekutai

(10) Patent No.: US 12,614,103 B1
(45) Date of Patent: Apr. 28, 2026

(54) DISTRIBUTED TRAINING OF MACHINE LEARNING MODELS IN WIRELESS COMPUTING ENVIRONMENTS

(71) Applicant: T-Mobile USA, Inc., Bellevue, WA (US)

(72) Inventor: Gaviphat Lekutai, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 1120 days.

(21) Appl. No.: 17/322,590

(22) Filed: May 17, 2021

(51) Int. Cl.
*G06N 20/00* (2019.01)
*G06N 3/08* (2023.01)
*H04W 88/02* (2009.01)

(52) U.S. Cl.
CPC .............. *G06N 20/00* (2019.01); *G06N 3/08* (2013.01); *H04W 88/02* (2013.01)

(58) Field of Classification Search
CPC .......... G06N 20/00; G06N 3/08; H04W 88/02
See application file for complete search history.

(56) References Cited

U.S. PATENT DOCUMENTS

| | | | |
|---|---|---|---|
| 2011/0247008 A1* | 10/2011 | Tamirisa ................. | G06F 9/541 |
| | | | 719/330 |
| 2016/0204847 A1* | 7/2016 | Ryu ....................... | H04W 72/51 |
| | | | 455/7 |
| 2017/0373935 A1* | 12/2017 | Subramanian ...... | G06F 11/3006 |
| 2022/0182802 A1* | 6/2022 | Pezeshki ............... | H04W 72/21 |
| 2022/0237507 A1* | 7/2022 | Bai ........................ | H04W 72/21 |
| 2022/0351069 A1* | 11/2022 | Li ........................... | G06N 3/098 |
| 2024/0046147 A1* | 2/2024 | Galtier ................... | G06N 20/00 |

* cited by examiner

*Primary Examiner* — James D. Rutten
(74) *Attorney, Agent, or Firm* — Perkins Coie LLP

(57) ABSTRACT

An artificial intelligence or machine learning controller generates aggregate machine learning models using models trained by a set of wireless computing devices. A first computing device accesses a set of training data that comprises a set of input data points and a set of output data points. The first computing device trains a first machine learning model using the set of training data and transmits the trained first machine learning model to the controller. The controller generates an aggregate model by aggregating the trained first machine learning model with a plurality of other trained machine learning models that were transmitted to the controller by other computing devices. The aggregate model is sent to the wireless devices or maintained at the controller, and used by either the computing devices or the controller to generate outputs for the devices.

20 Claims, 5 Drawing Sheets

DISTRIBUTED TRAINING OF MACHINE LEARNING MODELS IN WIRELESS COMPUTING ENVIRONMENTS

BACKGROUND

Machine learning is used in a wide variety of applications where development of conventional applications is difficult or unfeasible. Machine learning algorithms build a model based on sample data, known as training data, in order to make predictions or decisions without being explicitly programmed to do so. In order to train a model that is accurate and generalizable, machine learning algorithms typically make use of a significant amount of training data.

As the computing capabilities of increasingly diverse types of devices improve, more and more potential training data is generated and the number of applications for which models can be trained are ever increasing. This increase in the amount of training data and the number of applications for models is driven at least in part by a rise in the number of network-connected devices that generate or collect such training data and transmit it over a network, where it can be consolidated with the data generated by other such devices. However, transmitting large quantities of training data over a network can reduce performance of the network by occupying bandwidth that could be used to transmit other types of data. Furthermore, in some cases, there is a risk that privacy will be compromised when training data is transmitted over a network or consolidated from several devices.

BRIEF DESCRIPTION OF THE DRAWINGS

Detailed descriptions of implementations of the present invention will be described and explained through the use of the accompanying drawings.

Figure 1:
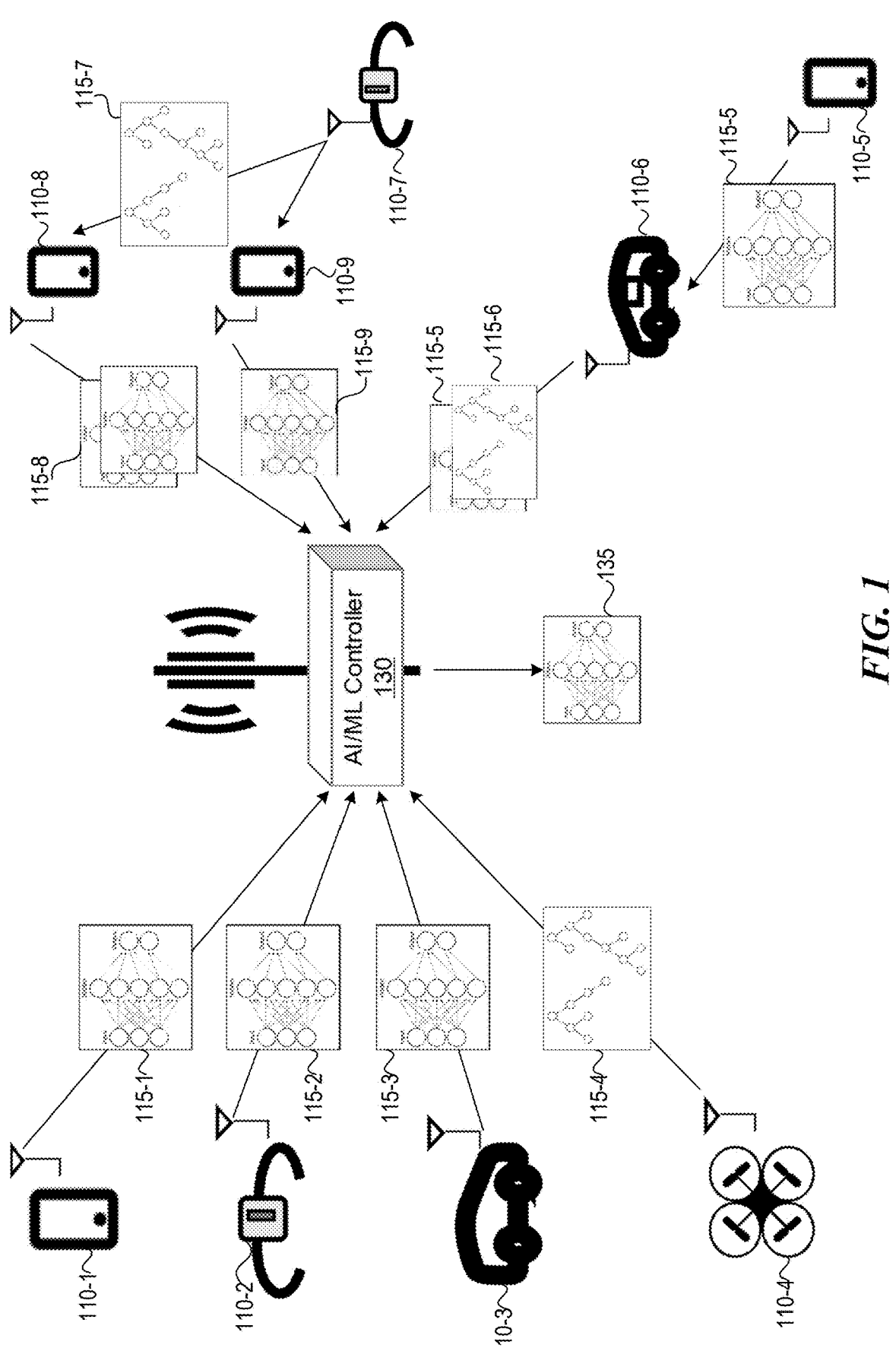
FIG. 1 illustrates a wireless computing environment in which aspects of the disclosed technology operate.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Privacy is often a chief concern in artificial intelligence (AI) or machine learning (ML) applications, especially when the AI or ML application operates in a wireless computing environment. To improve data privacy, an AI/ML controller according to implementations described herein generates machine learning models using models trained by a set of wireless computing devices. The wireless devices train individual machine learning models using training data generated or captured by each device and send the trained model, rather than the training data itself, to the controller. The controller uses the individual machine learning models to generate an aggregate machine learning model, which, for example, may generate more accurate predictions or classifications than at least some of the individual machine learning models. The aggregate model can then be sent to the wireless devices or maintained at the controller, and used by either the wireless devices or the controller to generate outputs for the wireless devices.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

FIG. 1 illustrates a wireless computing environment 100 ("environment 100") in which aspects of the disclosed technology operate. The environment 100 includes wireless devices 110, such as wireless devices 110-1 through 110-9, as well as an artificial intelligence or machine learning (AI/ML) controller 130 (also referred to herein as "controller 130").

The wireless devices 110 include any of a variety of special- or general-purpose computing devices that are capable of communicating over a wireless network. For example, the wireless devices 110 can include user equipment such as a mobile device 110-1, 110-5, 110-8, or 110-9; Internet of Things (IOT) devices 110-2 or 110-7; passenger vehicles 110-3 or 110-6; or unmanned aerial vehicles (UAVs, also referred to herein as drones) 110-4. The devices 110 can each include one or more sensors to receive inputs or measure parameters of the device or its environment. For example, the vehicles 110-3 and 110-6 can include sensors such as global positioning (GPS) sensors to determine a location of the vehicle, light detection and ranging (LIDAR) sensors to detect objects or features in an environment around the vehicle, or accelerometers or gyroscopes to measure motion of the vehicle. A drone 110-4 can similarly include GPS, imaging, or motion sensors, as well as an altimeter to measure a height of the drone. The IOT devices 110-2 or 110-7 can include any of a variety of sensors related to the functionality of the device, such as particle sensors for smoke detectors, temperature detectors for thermostats, accelerometers and/or physiological sensors in smart watches, or imaging and/or sound sensors for home security systems. The mobile devices 110-1, 110-5, 110-8, or 110-9 can include one or more types of sensors measuring a location or relative position of the device (such as a GPS sensor or accelerometer), a status of the device (such as battery state sensors or processor temperature sensors), a biometric or physiological parameter of a user of the device (such as a fingerprint sensor or an infrared camera), or a status of an environment of the device (such as an ambient light sensor or a barometer).

Each of the wireless devices 110 generate outputs based at least in part on the data generated by the device's sensors or data received from an external source, such as another wireless device 110. Different types of outputs that can be generated by each device vary according to the type of device and the applications for which the device is used. For example, the output generated by an IOT device 110-2 or 110-7 includes an alert that indicates the value of a parameter measured by a sensor in the IOT device. The output generated by a vehicle 110-3 or 110-6 includes an action to brake or accelerate the vehicle, or to steer the vehicle around an obstacle. The output generated by a drone 110-4 includes an action to change direction or to change a speed or altitude of flight. The output generated by a mobile device 110-1, 110-5, 110-8, or 110-9 includes a selection of a Wi-Fi frequency channel over which the mobile device will communicate, a classification of an object in a picture captured by the mobile device, or a selection of a navigation route from a current location of the mobile device to a specified destination.

At least some of the wireless devices 110 generate machine learning models 115 by training a respective model using training data collected or generated by the device. During operation, the wireless devices 110 use these machine learning models 115 and/or machine learning models received from other devices to generate outputs. A "model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayes clustering, reinforcement learning, probability distributions, decision trees, decision tree forests, and others. Models can be configured for various situations, data types, sources, and output formats.

In some implementations, one or more of the machine learning models 115 used in the environment 100 can be a neural network with multiple input nodes that receive an input data point or signal, such as a condition or state detected by or input to one of the wireless devices 110. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer ("the output layer"), one or more nodes can produce a value classifying the input that, once the model is trained, can be used to cause an output in a wireless device 110. In some implementations, such neural networks, known as deep neural networks, can have multiple layers of intermediate nodes with different configurations, can be a combination of models that receive different parts of the input and/or input from other parts of the deep neural network, or are convolutions-partially using output from previous iterations of applying the model as further input to produce results for the current input.

A machine learning model can be trained with supervised learning, where the training data includes inputs and desired outputs. Depending on the type of model and the wireless device 110 for which it is trained, the inputs can include, for example, sensor data collected by the wireless device or similar wireless devices, inputs by a user of the wireless device, or a signal received from another wireless device or the controller 130. The outputs used for training can likewise vary depending on the type of model or wireless device, for example including classifier labels applied to the input training data or desired actions by the wireless device in response to a set of input training data. A representation of a wireless device's desired output can be provided to the model. Output from the model can be compared to the desired output for the corresponding device and, based on the comparison, the model can be modified, such as by changing weights between nodes of the neural network or parameters of the functions used at each node in the neural network (e.g., applying a loss function). After applying each of the data points in the training data and modifying the model in this manner, the model can be trained to evaluate new data points (such as real-time sensor data measured by each device) to generate outputs for the wireless devices 110.

Depending on the type of wireless device, its location, its use in the environment 100, or other factors, the wireless devices 110 in the environment 100 can use different types of machine learning models, trained with different types of data, for different applications. For example, a vehicle, such as the vehicle 110-3, can use a neural network to process real-time light detection and ranging (LIDAR) signals to generate vehicle control outputs (such as braking, accelerating, or steering). A smart smoke detector, for example implemented as the IOT device 110-2, can use a decision tree to classify temperature and particle sensor data to determine whether there is likely a fire in the vicinity of the smoke detector. A wireless access point can use a model to predict where other devices will be physically located relative to the wireless access point in order to guide beamforming at the access point. Furthermore, different applications can use a machine learning model applied to substantially real-time data or to historical data. For example, a passenger vehicle or drone can use a model that receives as input substantially real-time information, such as objects currently in proximity to the vehicle, to generate outputs to control the position or speed of the vehicle. In contrast, when selecting a navigational route that is optimized for current traffic conditions, a vehicle can apply a model that takes as input both real-time information related to the amount of traffic on nearby streets and historical information indicating the likelihood that the traffic on each street will increase or decrease during the time the vehicle will be traveling.

Some of the wireless devices 110 can be part of an application group, which represents a set of devices that use the same or similar models to generate similar types of outputs. A set of vehicles located in approximately the same geographic area, for example, can use the same model to predict optimal driving routes based on traffic conditions and road types in that geographic area. Similar IOT devices that measure road parameters (such as real-time traffic data) can be part of an application group that uses similar models to predict traffic data on different roads. Mobile devices used by users with a similar feature (such as glasses-wearers) can be part of an application group that uses similar models to perform facial recognition for unlocking the mobile device. Still another example application group includes smart watches worn by users who engage in similar activities, such as frequent runners, where the smart watches in the application group execute similar models to calculate number of steps and distances traveled by their wearers while running.

The AI/ML controller 130 includes one or more computing devices that are collectively capable of communicating with the wireless devices 110 and generating machine learning models. Example implementations of the controller 130 include a base station, a mobile edge compute node, or one or more nodes in a private cloud, a public cloud, or a core network.

The AI/ML controller 130 generates aggregate machine learning models 135 based on one or more machine learning models 115 trained by one or more of the multiple wireless devices 110. Rather than training a model using raw data collected by the wireless devices 110, the controller 130 generates the aggregated model 135 using the trained models 115. Such aggregation of trained models beneficially improves privacy because the data used to train the models 115 is less likely to be compromised when it is only used locally at the corresponding wireless device 110 (or at a trusted second device) than when it is transmitted across public networks or stored at additional devices. Receiving the trained models 115, instead of the raw training data collected or applied by each wireless device 110, also reduces data transfer between the wireless devices 110 and the controller 130. In an example, a wireless device 110 trains a 10,000-node neural network with 10,000 data samples. Rather than sending the raw training data in the form of the 10,000 samples, where each sample may include anywhere from bytes of data to gigabytes of data, the wireless device 110 sends only the one-byte weight computed for each node during training of the neural network. This reduction in data transfer can improve performance of the wireless devices 110 (e.g., by reducing an amount of power consumed by the devices to transmit data) and/or performance of the network used by the wireless devices 110 and the controller 130 (e.g., by reducing network congestion).

An aggregate machine learning model 135 can be generated for any application in the environment 100. For example, a first aggregate model 135 is generated for use by a first application group of wireless devices 110 (such as a set of vehicles in a given geographic area), using the individual models 115 generated by the devices in the first application group. A second aggregate model 135 is generated for use by a second set of wireless devices 110 for a similar application, regardless of whether the second set of devices form an application group, using the individual models 115 generated by the devices in the second set.

Some implementations of the controller 130 select machine learning models 115 for aggregation based on explicit input at the controller. For example, the controller 130 stores identifiers of particular models 115 that should be aggregated into a particular aggregate model 135, as defined by an administrator of the controller 130 or an entity affiliated with an application in the environment 100 (such as an administrator of an entity that distributes software for a given application). In other implementations, machine learning models 115 are tagged with information describing the application for which the model is used or the application group to which the corresponding device 110 belongs. The controller 130 uses this information to select models 115 for aggregation. For example, the controller 130 aggregates two or more models 115 that are labeled as facilitating the same application. In still other implementations, the controller 130 applies a trained selection model to identify two or more machine learning models 115 to aggregate. Features input to the selection model can include, for example, information about the type of model 115, type of device 110 that trained the model, or location of the device 110.

Some implementations of the AI/ML controller 130 train a reference model using raw training data that is used to test and refine the aggregate model 135. For example, a test device similar to the wireless devices 110 that are associated with a given aggregate model 135 periodically feeds raw data to the controller 130. The raw data can include training data captured by the test device, a portion of the training data used by at least one of the wireless devices 110, or a combination of training data received from other sources. Alternatively, the test devices can include one or more devices that are located within a network coverage area associated with the controller 130, and feed the controller 130 network data that is used by the controller to determine how and when to send data to or receive data from the wireless devices 110. For example, the test devices periodically measure downlink or uplink network speeds or throughput on the network. The controller 130 uses the network data captured by the one or more test devices to train a model to predict characteristics of the network under varying conditions.

In some cases, the AI/ML controller 130 sends the aggregate models 135 it generates to any device associated with one of the individual models 115 used in the creation of a corresponding aggregate model 115. The wireless devices 110 can then use the aggregate model 135 to compute outputs. In other cases, the controller 130 uses the aggregate model 135 to compute a result, such as generating a prediction or classifying input data, and returns the result rather than the aggregate model to a wireless device 110. For example, the controller 130 receives a current location of a vehicle and a desired destination, and uses the aggregate model to select a route for the vehicle to follow to reach the desired destination in the shortest amount of time. In another example, the controller 130 uses the aggregate model to classify an object in a picture captured by a wireless device, and returns the classification to the wireless device instead of the aggregate model. For some applications or types of devices, the controller 130 selectively sends an aggregate model to one device and a computed output to another device.

A determination for whether to send the aggregate model 135 or computed results can be based on rules specified by an administrator of the controller 130. For example, a rule can specify that an aggregate model associated with a particular application should be transmitted to the corresponding wireless devices 110 for use by the devices. Another rule can specify that a particular wireless device 110 should receive outputs computed by the controller 130, rather than the aggregate model. Still other rules can cause the controller 130 to transmit outputs until a condition is satisfied, at which point the aggregate model 135 is sent to one or more wireless devices 110. Example conditions include a specified time of day (e.g., such that models are transmitted overnight when network traffic is lower), a specified network parameter (e.g., such that models are transmitted when a real-time measurement of network latency indicates that the latency is below a specified threshold), a type of network (e.g., such that models are transmitted when the wireless device is connected to a 5G network or a WiFi network, but not transmitted when the device is connected to a 4G network), or a status of the wireless device (e.g., such that models are transmitted to the device when the device is sending or receiving less than a threshold amount of data in a given time period, either predicted or measured in real-time). Furthermore, the controller 130 can apply a privacy-based rule to determine whether to send the aggregate model or a computed output. For example, if generating an output using an aggregate model requires applying private input data to the aggregate model, a user of or administrator associated with a wireless device can create a rule that causes the controller 130 to send the aggregate model to the wireless device to avoid the transmission of the private input data to the controller 130. In another example, a user of a wireless device that generated an individual model 115 can specify a privacy rule to enable the controller 130 to generate an aggregate model using the individual model 115, but disallowing the aggregate model to be transmitted to other wireless devices.

The determination to send the aggregate model 135 or computed results, as well as a time to send the model or results, can alternatively be based on application of a network optimization model trained to predict an optimal data type for a particular wireless device 110 or application. Parameters used to train the network optimization model can include, for example, device capabilities, the types of data input to or output by the aggregate model 135 for a particular application or by a particular device, types of networks to which a particular device is usually connected, typical latency or bandwidth on the networks to which the device connects, how much the device moves, times of day the device is typically operated, or amount of data typically sent or received by the device at given times. The network optimization model can be trained to predict, for example, that a particular application will typically use an aggregate model to analyze real-time inputs to compute corresponding real-time outputs, rather than using non-real-time inputs or outputs, and thus the devices associated with the application would operate more efficiently if the aggregate model is sent to the device. In another example, the network optimization model can predict that a type of device (such as a vehicle) is likely to move around enough that it will have varying access to a network connection during times the aggregate model is needed, and thus the aggregate model should be sent to the device when the device is connected to a reliable network. In a further example, the network optimization model is trained to predict that a certain type of device is unlikely to have the computing resources available to generate an output using the aggregate model, and thus the controller 130 should only send outputs to devices of that type.

In some implementations, the controller 130 communicates aggregated models to vehicles based on factors such as time and distance of the corresponding wireless devices 110 from the controller 130, signal strengths between the devices 110 and the controller 130, power level of the device, or signal to noise ratio. The controller 130 compares these values for a set of devices, such as a set of mobile phones or a set of vehicles. When aggregating models from the devices in the set, the controller 130 identifies the device type and applies scaling factors to improve performance of the devices or the network between the controller 130 and the devices. For example, a controller that takes the form of a cellular base station aggregates models for mobile phones in the geographic area of the base station. After generating the aggregate model, the base station suggests a power for the mobile phones to use to receive or apply the aggregate model (overriding pre-existing power management settings), based for example on the distance of each mobile device from the base station. Similarly, when sending an aggregate model to a vehicle, the controller 130 can recommend a power setting for the vehicle based on the speed of the vehicle (e.g., recommending reducing power if the vehicle is travelling faster than 65 miles per hour) or a frequency setting for the vehicle's communications based on the latency needs of the application.

Some of the wireless devices 110 shown in FIG. 1 communicate with intermediary devices, rather than directly sending data to or receiving data from the AI/ML controller 130. Some wireless devices can send training data to an intermediary device, which trains a model using the training data and passes the trained model to the controller 130 for use in aggregate model generation. Other wireless devices send a trained model to an intermediary device for the intermediary device to send to the controller 130. Similarly, wireless devices can receive aggregate models—or outputs computed using aggregate models—from an intermediary device rather than directly from the controller 130.

In some cases, an intermediary device transmits models to the controller 130 that are trained using only training data received from an origin device. By way of example, FIG. 1 shows a mobile device 110-5 that sends a trained model 115-5 to a vehicle 110-6, where the model 115-5 is trained by the mobile device 110-5 using training data generated by or received at the mobile device 110-5. The vehicle 110-6, in turn, separately sends the controller 130 both the model 115-5 and a model 115-6 trained using another training data set generated by or received at the vehicle 110-6. In this example, the vehicle 110-6 can instead train the mobile device-specific model 115-5 using a training data set received from the mobile device 110-5, while also separately training the vehicle-specific model 115-6.

In other cases, an intermediary device trains models using training data received from multiple origin devices and/or training data generated by the intermediary device. For example, FIG. 1 shows an IOT device 110-7 that sends a training data set to the mobile device 110-9. The mobile device 110-9 trains a machine learning model 115-9 using the training data received from the IOT device 110-7 as well as training data generated by the mobile device 110-9.

Intermediary devices can be selected based on factors such as processing capabilities of the intermediary devices, communications capabilities of the intermediary devices, or privacy rules. For example, a first wireless device that lacks the processing power to train a machine learning model can send training data to a trusted, designated intermediary device, such as another device owned by the same user. In another example, a highly-mobile first wireless device (such as a vehicle) transmits a trained model to any suitable intermediary device that is nearby at a designated time (e.g., when the training has been completed). The first wireless device can additionally send identical or different sets of training data to each of multiple intermediary devices, which can operate in a distributed fashion to train a single model or which can train multiple models using the sets of training data.

Finally, a wireless device can send data to or receive data from the controller 130 under some circumstances but transmit data through an intermediary device under other circumstances, based on application of rules or the network optimization model. For example, one of the wireless devices can be a passenger vehicle that has limited bandwidth for communicating with the controller 130 while the vehicle is driving (e.g., as a result of other communications being higher priority during operation of the vehicle). A rule can specify that an aggregate model should be held at an intermediary device, such as the driver's mobile phone, while the vehicle is driving so as to not interfere with normal operation of the vehicle. However, when the vehicle is parked, the vehicle can directly receive the aggregate model or an output from the controller 130.

The wireless devices 110 communicate with the AI/ML controller 130, other wireless devices 110, or both via one or more networks. The one or more networks can include any of a variety of individual connections via the internet such as cellular or other wireless networks, such as 4G networks, 5G networks, or WiFi. In some embodiments, the network can connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, or LAN. Because the information transmitted can be personal or confidential, security concerns can dictate one or more of these types of connections be encrypted or otherwise secured. In some embodiments, however, the information being transmitted can be less personal, and therefore the network connections can be selected for convenience over security. The network can comprise any type of computer networking arrangement used to exchange data. For example, the network can be the Internet, a private data network, virtual private network using a public network, and/or other suitable connection(s) that enables components in system environment 100 to send and receive information between the components of system environment 100. The network can also include a public switched telephone network ("PSTN") and/or a wireless network.

Wireless Communications System

Figure 2:
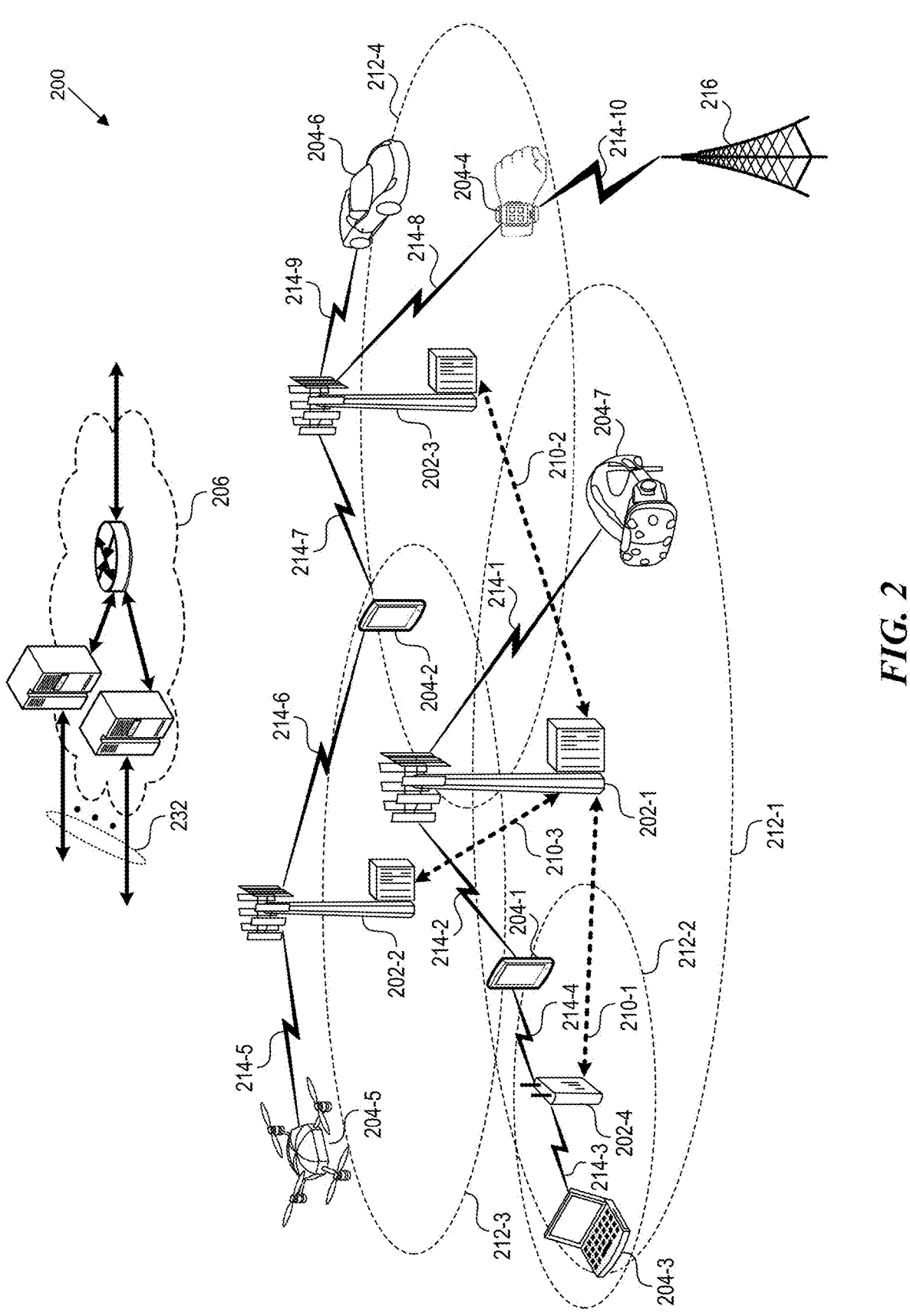
FIG. 2 is a block diagram that illustrates a wireless communications system.

FIG. 2 is a block diagram that illustrates a wireless telecommunication system 200 ("system 200") in which aspects of the disclosed technology are incorporated. The system 200 includes base stations 202-1 through 202-4 (also referred to individually as "base station 202" or collectively as "base stations 202"). A base station is a type of network access node (NAN) that can also be referred to as a cell site, a base transceiver station, or a radio base station. The system 200 can include any combination of NANs including an access point, radio transceiver, gNodeB (gNB), NodeB, eNodeB (eNB), Home NodeB or eNodeB, or the like. In addition to being a WWAN base station, a NAN can be a WLAN access point, such as an Institute of Electrical and Electronics Engineers (IEEE) 802.11 access point.

The NANs of a network formed by the system 200 also include wireless devices 204-1 through 204-8 (referred to individually as "wireless device 204" or collectively as "wireless devices 204") and a core network 206. The wireless devices 204-1 through 204-8 can correspond to or include network entities capable of communication using various connectivity standards. For example, a 5G communication channel can use millimeter wave (mmW) access frequencies of 28 GHz or more. In some implementations, the wireless device 204 can operatively couple to a base station 202 over an LTE/LTE-A communication channel, which is referred to as a 4G communication channel.

The core network 206 provides, manages, and controls security services, user authentication, access authorization, tracking, Internet Protocol (IP) connectivity, and other access, routing, or mobility functions. The base stations 202 interface with the core network 206 through a first set of backhaul links 208 (e.g., S1 interfaces) and can perform radio configuration and scheduling for communication with the wireless devices 204 or can operate under the control of a base station controller (not shown). In some examples, the base stations 202 can communicate, either directly or indirectly (e.g., through the core network 206), with each other over a second set of backhaul links 210-1 through 210-3 (e.g., X1 interfaces), which can be wired or wireless communication links.

The base stations 202 can wirelessly communicate with the wireless devices 204 via one or more base station antennas. The cell sites can provide communication coverage for geographic coverage areas 212-1 through 212-4 (also referred to individually as "coverage area 212" or collectively as "coverage areas 212"). The geographic coverage area 212 for a base station 202 can be divided into sectors making up only a portion of the coverage area (not shown). The system 200 can include base stations of different types (e.g., macro and/or small cell base stations). In some implementations, there can be overlapping geographic coverage areas 212 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC)), etc.

The system 200 can include a 5G network and/or an LTE/LTE-A or other network. In an LTE/LTE-A network, the term eNB is used to describe the base stations 202 and in 5G new radio (NR) networks, the term gNBs is used to describe the base stations 202 that can include mmW communications. The system 200 can thus form a heterogeneous network in which different types of base stations provide coverage for various geographical regions. For example, each base station 202 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices with service subscriptions with a wireless network service provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively smaller geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 204 and the base stations 202 or core network 206 supporting radio bearers for the user plane data. At the Physical (PHY) layer, the transport channels are mapped to physical channels.

As illustrated, the wireless devices 204 are distributed throughout the system 200, where each wireless device 204 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 204-1 and 204-2), a tablet computer, a laptop computer (e.g., wireless device 204-3), a wearable (e.g., wireless device 204-4). A wireless device can be included in another device such as, for example, a drone (e.g., wireless device 204-5), a vehicle (e.g., wireless device 204-6), an augmented reality/virtual reality (AR/VR) device such as a head-mounted display device (e.g., wireless device 204-7), an IoT device such as an appliance in a home (e.g., wireless device 204-8), a portable gaming console, or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 214-1 through 214-11 (also referred to individually as "communication link 214" or collectively as "communication links 214") shown in system 200 include uplink (UL) transmissions from a wireless device 204 to a base station 202, and/or downlink (DL) transmissions, from a base station 202 to a wireless device 204. The downlink transmissions can also be called forward link transmissions while the uplink transmissions can also be called reverse link transmissions. Each communication link 214 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 214 can transmit bidirectional communications using FDD (e.g., using paired spectrum resources) or TDD operation (e.g., using unpaired spectrum resources). In some implementations, the communication links 214 include LTE and/or mmW communication links.

In some implementations of the system 200, the base stations 202 and/or the wireless devices 204 include multiple antennas for employing antenna diversity schemes to improve communication quality and reliability between base stations 202 and wireless devices 204. Additionally or alternatively, the base stations 202 and/or the wireless devices 204 can employ multiple-input, multiple-output (MIMO) techniques that can take advantage of multi-path environments to transmit multiple spatial layers carrying the same or different coded data.

Training Machine Learning Models in a Wireless Computing Environment

Figure 3A:
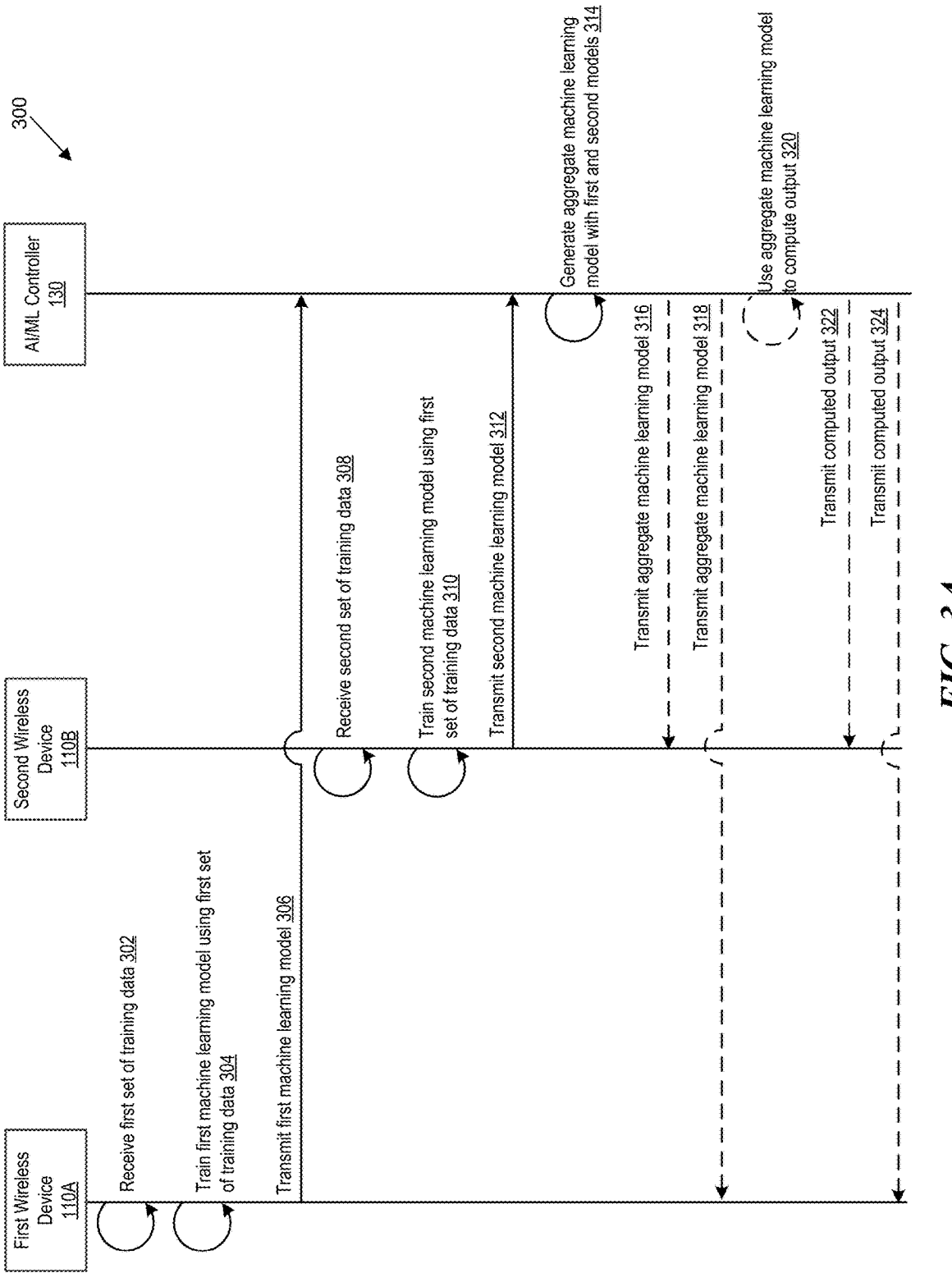
FIG. 3A is an interaction diagram that illustrates a process for generating and using machine learning models in a wireless computing environment.

FIG. 3A is an interaction diagram that illustrates a process 300 for generating and using machine learning models in a wireless computing environment. As shown in FIG. 3A, the process 300 includes communications between a first wireless device 110A, a second wireless device 110B, and the AI/ML controller 130. The first and second wireless devices 110A each can be, for example, any of the wireless devices 110-1 through 110-9 described with respect to FIG. 1.

At block 302 in FIG. 3A, the first wireless device 110A receives a first set of training data. The first set of training data can include data generated or captured by the first wireless device 110A. For example, the first wireless device 110A includes sensors that measure a status of the device or its environment, and the first set of training data includes data output by the sensors. Additionally or alternatively, the first set of training data can include data received from an external source, such as another wireless device. For example, the first set of training data can include data output by the sensors of another wireless device and transmitted to the first wireless device 110A by the other wireless device.

Using the first set of training data, the first wireless device 110A trains a first machine learning at block 304. Any of a variety of types of machine learning models can be generated by the first wireless device 110A. For example, the first machine learning model can be a model trained to predict an outcome associated with the wireless device 110A, its environment, or data it has captured or received, given a known input or state. The first machine learning model can instead be a model trained to classify an input or observed state of the device or its environment. At block 306, the first wireless device 110A transmits the first machine learning model to the AI/ML controller 130.

In a similar manner, the second wireless device 110B receives a second set of training data at block 308, trains a second machine learning model using the second set of training data at block 310, and transmits the second machine learning model to the controller 130 at block 312. Like the first set of training data, the second set of training data can include data generated or captured by the second wireless device 110B (for example using one or more sensors in the device), data received from another device, or both. The second machine learning model trained using the second set of data can be the same type of model as the first machine learning model or a different type of model.

The AI/ML controller 130 receives the first and second machine learning models from the first and second wireless devices 110A, B and uses at least the first and second models to train an aggregate machine learning model at block 314. The first and second models can be combined with models received from any number of other wireless devices or trained by the AI/ML controller 130. When generated from multiple machine learning models, the aggregate model can be more accurate than the models trained by each wireless device, for example because the aggregate model represents more training data or more diverse training data, or is trained using the greater computational resources available to the controller 130 as compared to the wireless devices 110.

Once the aggregate machine learning model has been generated, the controller 130 optionally transmits the aggregate model to the second wireless device 110B at block 316 and to the first wireless device 110A at block 318. The first and second wireless devices 110 can then use the aggregate model to compute outputs in real time during operation of the devices.

Instead of transmitting the model itself to the wireless devices 110, the controller 130 can optionally use the aggregate machine learning model to compute an output 320, which is transmitted to the second and first wireless devices 110 at, respectively, blocks 322 and 324. The output can be computed by applying the aggregate model to a data point or data set received from the first or second wireless device. For example, an IOT device can send the controller 130 a measurement captured by a sensor in the device. The controller 130 applies the aggregate model to the sensor measurement to classify the measurement, and returns the classification to the IOT device.

In the process shown in FIG. 3A, the controller 130 can alternatively transmit the aggregate machine learning model itself or an output computed using the aggregate model to both the first and second wireless devices, or transmit the aggregate model to one device while transmitting a computed output to the other device. In various implementations, the controller 130 applies rules, a network optimization model, or both, to determine whether and when to transmit the aggregate machine learning model or an output computed using the aggregate model.

Figure 3B:
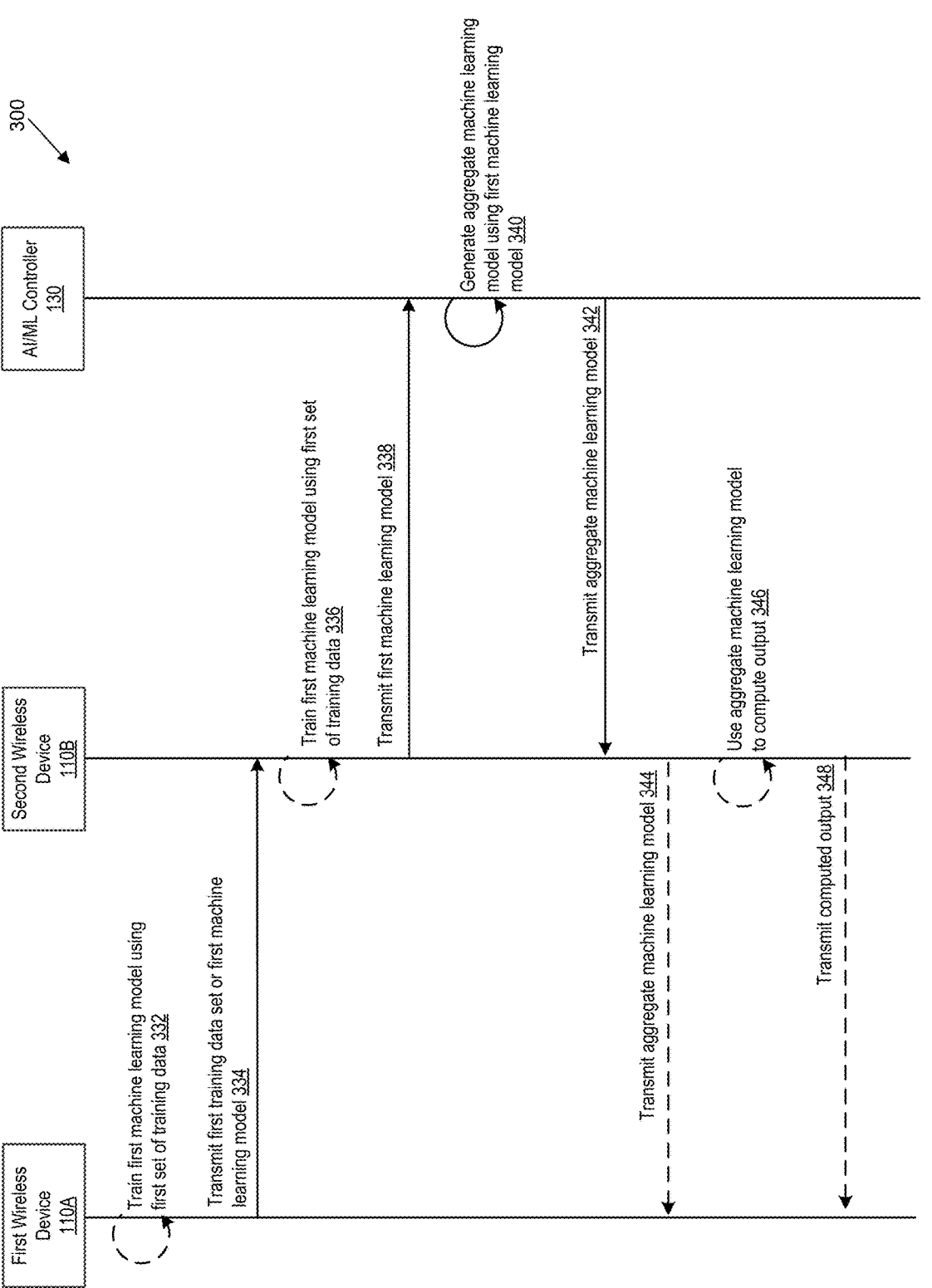
FIG. 3B is an interaction diagram that illustrates another process for generating and using machine learning models in a wireless computing environment.

FIG. 3B is an interaction diagram illustrating another implementation of the process 300 for generating and using machine learning models in a wireless computing environment. Aspects of the implementations shown in FIG. 3B can be similar to aspects of the implementations shown in FIG. 3A. However, in FIG. 3B, the second wireless device 110B functions as an intermediate device between the first wireless device 110A and the AI/ML controller 130.

As shown in FIG. 3B, the first wireless device 110A optionally trains a first machine learning model using a first set of training data at block 332, and transmits the first machine learning model to the second wireless device 110B at block 334. Instead of or in addition to training the first model, the first wireless device 110A can transmit the first set of training data to the second wireless device 110B at block 334, which the second wireless device uses to train the first model at block 336. In some cases, the second wireless device 110B additionally trains a second model using a second set of training data that is received or accessed by the second device, in combination with the first set of training data, or the first machine learning model, or a combination of the two. Using the second wireless device 110B to train the first model, rather than the first device 110A, can be advantageous when the first wireless device has limited computing resources. For example, if the first wireless device 110A is a battery-operated IOT device, the first device can transmit the training data it collects to the second device for training the model in order to conserve its limited battery power. Similarly, the second wireless device 110B can be a device that has greater processing capabilities, such as a faster processor, a greater number of processor cores, or a different type of processor that is more suited to training a model than the processor of the first wireless device 110A (such as a graphical processing unit (GPU) instead of an application-specific integrated circuit (ASIC)).

Whether trained by the first wireless device 110A or the second 110B, the second wireless device transmits the first machine learning model to the AI/ML controller 130 at block 338. When the second wireless device trains a second machine learning model, the second model can also be sent to the controller 130 at block 338.

The controller 130 uses the first model, as well as trained models received from other wireless devices, to generate an aggregate machine learning model at block 340. In some implementations, when the second wireless device trains the second machine learning model, both the first and second models are used to generate the same aggregate model. In other implementations, the controller 130 uses the first and second machine learning models to generate different respective aggregate models. The aggregate model that is generated using at least the first trained model is transmitted to the second wireless device 110B at block 342.

The second wireless device 110B can optionally transmit the aggregate machine learning model to the first wireless device 110A at block 344, enabling the first device to use the model to compute outputs. Alternatively, the second device 110B uses the aggregate model to compute an output at block 346 and transmits the output to the first device 110A at block 348.

Since different types of wireless devices 110 can have different computational and communication capabilities, and these capabilities can vary across different operational stages of each wireless device, some implementations of the process 300 adjust timing of the steps illustrated in FIGS. 3A-3B according to the capabilities of each wireless device and/or the real-time availability of network communications with the controller 130. For example, the controller 130 applies rules or a network optimization model to select times to allocate uplink resources to a wireless device in order to receive a model from the device, to select times to send aggregate models to the wireless devices, or to select times for other steps described in FIGS. 3A-3B.

Computer System

Figure 4:
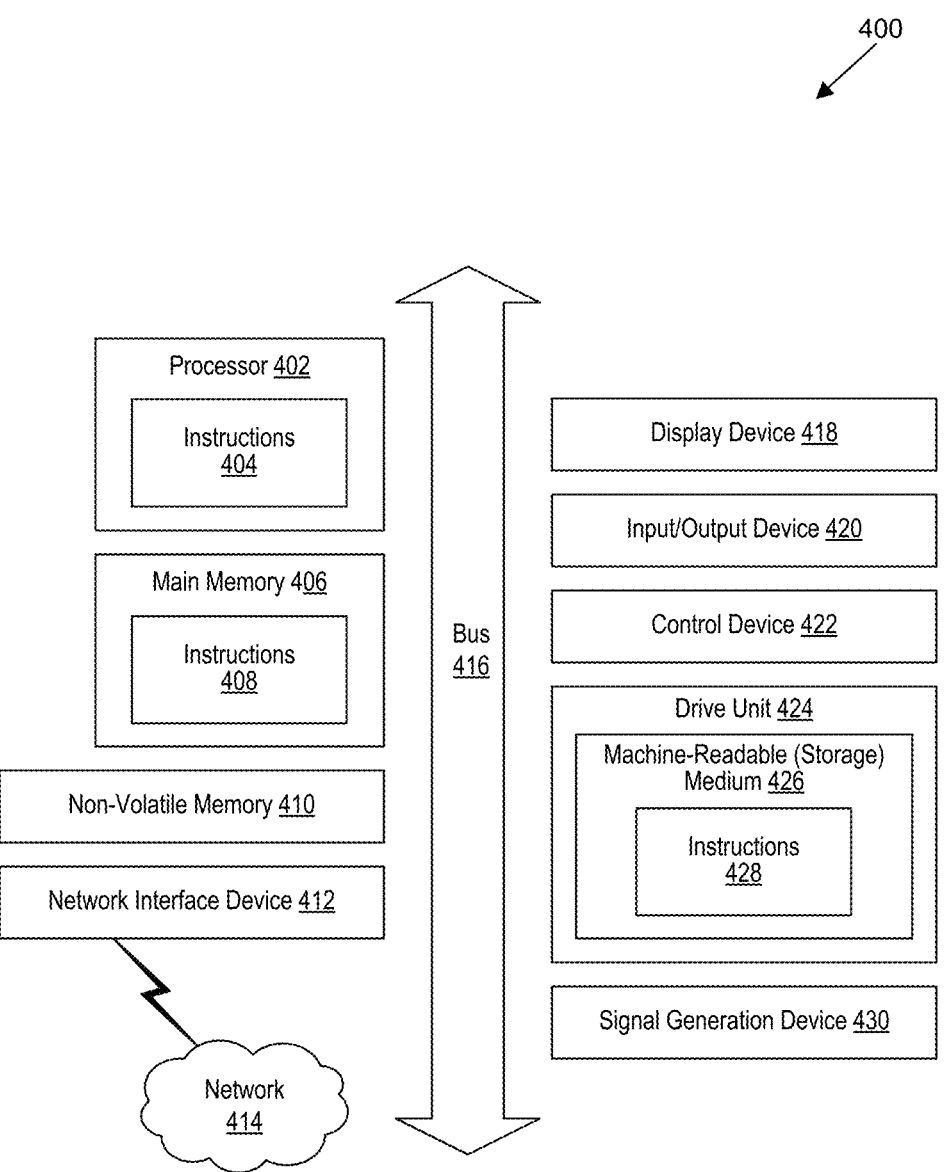
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A method for training machine learning models in a wireless networking environment, the method comprising:

accessing, by a first wireless computing device, a set of training data that includes a set of input data points and a set of output data points, each output data point in the set of output data points defining a desired output from the first wireless computing device using at least one input data point in the set of input data points;

wherein the first wireless computing device is a vehicle;

training, by the first wireless computing device, a first machine learning model using the training data;

determining, by the first computing device, whether the first wireless computing device is driving or stationary;

responsive to a determination that the first wireless computing device is stationary, transmitting, by the first computing device, the first trained machine learning model to a remote controller;

responsive to a determination that the first wireless computing device is driving, transmitting, by the first computing device, the trained first machine learning model to a designated trusted device, wherein the first wireless computing device has a first level of communication capability with the remote controller, wherein the designated trusted device has a second level of communication capability with the remote controller that is greater than the first level of communication capability, and wherein the first wireless computing device transmits the trained first machine learning model to the designated trusted device responsive to the second level of communication capability being greater than the first level of communication capability, wherein the designated trusted device is associated with a same user as the first wireless computing device; and wherein the designated trusted device transmits the first trained machine learning model to the remote controller configured to aggregate the trained first machine learning model with one or more other trained machine learning models at the controller, wherein at least one of the other trained machine learning models at the controller are received via other wireless computing devices to generate an aggregate model; and applying, by the first wireless computing device, the aggregate model to generate an output by the first wireless computing device.

2. The method of claim 1, wherein the first wireless computing device comprises one or more sensors, and wherein the set of training data includes data generated by the one or more sensors.

3. The method of claim 1, wherein the set of training data includes data received from a second wireless computing device communicatively coupled to the first wireless computing device, and wherein the first machine learning model is trained using the data received from the second wireless computing device.

4. The method of claim 3, further comprising:

receiving the aggregate model from the controller; and transmitting the aggregate model to the second wireless computing device for use by the second wireless computing device.

5. The method of claim 3, further comprising:

applying, by the first wireless computing device, the aggregate model to compute an output for the second wireless computing device; and transmitting the computed output to the second wireless computing device.

6. The method of claim 3, wherein the set of training data further includes data generated by the first wireless computing device, and wherein training the first machine learning model comprises using the data received from the second wireless computing device and the data generated by the first wireless computing device.

7. The method of claim 3, wherein the second wireless computing device is a different type of computing device than the first wireless computing device.

8. The method of claim 1, wherein transmitting the trained first machine learning model to the controller comprises:

storing the trained first machine learning model at the first wireless computing device;

selecting, by the first wireless computing device, a time to transmit the trained first machine learning model to the controller based on application of a rule; and transmitting the trained first machine learning model to the controller at the selected time.

9. The method of claim 1, wherein transmitting the trained first machine learning model to the controller comprises:

storing the trained first machine learning model at the first wireless computing device;

selecting, by the first wireless computing device, a time to transmit the trained first machine learning model to the controller based on application of a network optimization model; and transmitting the trained first machine learning model to the controller at the selected time.

10. The method of claim 1, wherein the first wireless computing device is a passenger vehicle or an unmanned aerial vehicle (UAV).

11. The method of claim 1, wherein the controller comprises a base station, a mobile edge compute node, a private cloud network, a public cloud network, or a core network.

12. At least one computer-readable storage medium, excluding transitory signals and carrying instructions, which, when executed by at least one data processor of a system, cause the system to:

receive a first machine learning model trained by a first computing device;

receive a second machine learning model trained by a second computing device;

receive additional machine learning models from a plurality of computing devices other than the first computing device and the second computing device, wherein the first computing device, the second computing device, and the plurality of computing devices comprise at least one vehicle configured to be either driving or stationary, wherein, when at least one of a respective device of the first computing device, the second computing device, and the plurality of computing devices is stationary, the system receives a respective machine learning model of the first machine learning model, the second machine learning model, and the additional machine learning models directly from the respective device, and wherein, when at least one of the respective device of the first computing device, the second computing device, and the plurality of computing devices is driving, the system receives the respective machine learning model of the first machine learning model, the second machine learning model, and the additional machine learning models via a designated trusted device;

receive real-time location information from the first computing device, the second computing device, and the plurality of computing devices, wherein the real-time location information is determined using respective location sensors of the first computing device, the second computing device, and the plurality of computing devices, wherein the first computing device and the plurality of computing devices are associated with a first application and, based on the location information, are located in a first geographical area, wherein the first machine learning model and the additional machine learning models are each assigned a tag associating them with the first application and the first geographic area, wherein the second computing device is associated with a second application different from the first application or is located in a second geographical area different from the first geographical area, and wherein the second machine learning model is assigned a tag associating it with the second application or the second geographical area;

generate an aggregate machine learning model using the first machine learning model and the additional machine learning models, wherein the first machine learning model and the additional machine learning models are selected for aggregation based on the tag associated with the first application and the first geographic area; and selectively transmit the aggregate machine learning model to the first computing device and the plurality of computing devices without transmitting the aggregate machine learning model to the second computing device.

13. The at least one computer-readable storage medium of claim 12, wherein selectively transmitting the aggregate machine learning model to the first computing device comprises:

storing the aggregate machine learning model;

selecting a time to transmit the aggregate machine learning model to the first computing device based on application of a rule; and transmitting the aggregate machine learning model to the first computing device at the selected time.

14. The at least one computer-readable storage medium of claim 12, wherein selectively transmitting the aggregate machine learning model to the first computing device comprises:

storing the aggregate machine learning model;

selecting a time to transmit the aggregate machine learning model to the first computing device based on application of a network optimization model; and transmitting the aggregate machine learning model to the first computing device at the selected time.

15. The at least one computer-readable storage medium of claim 12, wherein selectively transmitting the aggregate machine learning model to the first computing device comprises:

transmitting the aggregate machine learning model to the first computing device;

computing an output using the aggregate machine learning model; and sending the computed output to a second computing device of the plurality of computing devices for use by the second computing device.

16. The at least one computer-readable storage medium of claim 12, wherein the system is further caused to determine to transmit the aggregate machine learning model to the first computing device and the computed output to the second computing device based on application of a privacy rule.

17. The at least one computer-readable storage medium of claim 12, wherein the system is further caused to:

identify the plurality of computing devices based on the plurality of computing devices being part of an application group including the first computing device.

18. The at least one computer-readable storage medium of claim 12, wherein the plurality of computing devices comprises two or more different types of computing devices selected from a mobile device, an Internet of Things (IOT) device, a passenger vehicle, or an unmanned aerial vehicle (UAV).

19. The at least one computer-readable storage medium of claim 12, wherein the system is further caused to:

transmitting, in an instance that the second computing device is associated with the second application, an output computed using the aggregate machine learning model to the second computing device.

20. A system associated with a vehicle, comprising:

at least one hardware processor; and at least one non-transitory memory storing instructions, which, when executed by the at least one hardware processor, cause the system to:

access a set of training data;

train a first machine learning model using the set of training data;

determine whether the vehicle is driving or stationary;

responsive to a determination that the vehicle is stationary, transmit the first trained machine learning model to a remote computing device;

responsive to a determination that the vehicle is driving, transmit the first machine learning model to a designated trusted device, wherein the system has a first level of communication capability with the remote computing device, wherein the designated trusted device has a second level of communication capability with the computing device that is greater than the first level of communication capability, and wherein the system transmits the trained first machine learning model to the designated trusted device responsive to the second level of communication capability being greater than the first level of communication capability, wherein the designated trusted device is associated with a same user as the system; and wherein the designated trusted device is caused to transmit the first trained machine learning model to the remote computing device configured to:

aggregate the first machine learning model with a plurality of other trained machine learning models to generate an aggregate model, and

compute an output based on application of the aggregate model; and apply the output computed by the remote computing device.

* * * * *